（12） United States Patent
Levy et al.

(10) Patent No.: US 10,496,680 B2
(45) Date of Patent: *Dec. 3, 2019

(54) HIGH-PERFORMANCE BLOOM FILTER ARRAY

(71) Applicant: Mellanox Technologies TLV Ltd., Ra'anana (IL)

(72) Inventors: Gil Levy, Hod Hasharon (IL); Pedro Reviriego, Madrid (ES); Salvatore Pontarelli, Rome (IT); Efim Yehiel Kravchik, Holon (IL)

(73) Assignee: Mellanox Technologies TLV Ltd., Ra'anana (IL)

( * ) Notice: Subject to any disclaimer, the term of this patent is extended or adjusted under 35 U.S.C. 154(b) by 1026 days.

This patent is subject to a terminal disclaimer.

(21) Appl. No.: 14/827,402

(22) Filed: Aug. 17, 2015

(65) Prior Publication Data
US 2017/0053012 A1 Feb. 23, 2017

(51) Int. Cl.
*G06F 16/28* (2019.01)
*G06N 5/04* (2006.01)
(Continued)

(52) U.S. Cl.
CPC ...... *G06F 16/285* (2019.01); *G06F 16/90335* (2019.01); *G06N 5/04* (2013.01);
(Continued)

(58) Field of Classification Search
CPC .................................................. G06F 16/285
See application file for complete search history.

(56) References Cited

U.S. PATENT DOCUMENTS 6,611,875 B1 8/2003 Chopra et al.
6,957,215 B2 10/2005 Stark
(Continued)

FOREIGN PATENT DOCUMENTS

WO 2004095784 A2 11/2004

OTHER PUBLICATIONS

Hua et al., "Variable-Stride Multi-Pattern Matching for Scalable Deep Packet Inspection", IEEE INFOCOM, pp. 415-423, Rio de Janeiro, Brazil, Apr. 19-25, 2009.
(Continued)

*Primary Examiner* — Mark D Featherstone
*Assistant Examiner* — Ranjit P Doraiswamy
(74) *Attorney, Agent, or Firm* — Kligler & Associates

(57) ABSTRACT

A method for classification includes extracting respective classification keys from a collection of data items and defining a set of patterns for matching to the classification keys. A plurality of memory banks contain respective Bloom filters, each Bloom configured to indicate one or more patterns in the set that are candidates to match a given classification key. A respective first hash function is applied to the classification keys for each pattern in order to select, for each classification key, one of the Bloom filters to query for the pattern. The selected Bloom filters are queried by applying a respective second hash function to each classification key, so as to receive from the Bloom filters an indication of the one or more candidate patterns. The data items are classified by matching the respective classification keys against the candidate patterns.

17 Claims, 6 Drawing Sheets

(51) Int. Cl.
  *G06F 16/903* (2019.01)
  *H04L 12/743* (2013.01)
  *H04L 12/935* (2013.01)

(52) U.S. Cl.
  CPC ...... *H04L 45/7453* (2013.01); *H04L 45/7457* (2013.01); *H04L 49/3063* (2013.01)

(56) References Cited

U.S. PATENT DOCUMENTS

| | | |
|---|---|---|
| 7,051,078 B1 | 5/2006 | Cheriton |
| 7,054,315 B2 | 5/2006 | Liao |
| 7,061,874 B2 | 6/2006 | Merugu et al. |
| 7,116,663 B2 | 10/2006 | Liao |
| 7,234,019 B1 | 6/2007 | Kao et al. |
| 7,804,699 B2 | 9/2010 | Gupta et al. |
| 7,933,282 B1 | 4/2011 | Gupta et al. |
| 8,271,564 B2 | 9/2012 | Dade et al. |
| 8,290,934 B2 | 10/2012 | Stergiou et al. |
| 8,305,271 B2 | 11/2012 | Li et al. |
| 8,462,786 B2 | 6/2013 | Liu et al. |
| 8,619,766 B2 | 12/2013 | Wang et al. |
| 8,856,203 B1 | 10/2014 | Schelp et al. |
| 9,111,615 B1 | 8/2015 | Jiang |
| 9,171,030 B1 | 10/2015 | Arad et al. |
| 9,223,711 B2 | 12/2015 | Philip et al. |
| 9,262,312 B1 | 2/2016 | Gazit et al. |
| 9,317,517 B2 | 4/2016 | Attaluri et al. |
| 9,344,366 B2 | 5/2016 | Bouchard et al. |
| 9,424,366 B1 | 8/2016 | Gazit et al. |
| 9,438,505 B1 | 9/2016 | Zhou et al. |
| 9,569,561 B2 | 2/2017 | Wildman et al. |
| 9,659,046 B2 | 5/2017 | Sen et al. |
| 9,704,574 B1 | 7/2017 | Shamis |
| 9,779,123 B2 | 10/2017 | Sen et al. |
| 9,785,666 B2 | 10/2017 | Li et al. |
| 2002/0089937 A1 | 7/2002 | Venkatachary et al. |
| 2006/0209725 A1 | 9/2006 | Cadambi et al. |
| 2008/0192754 A1 | 8/2008 | Ku et al. |
| 2008/0228691 A1 | 9/2008 | Shavit et al. |
| 2010/0080223 A1 | 4/2010 | Wong et al. |
| 2010/0269024 A1* | 10/2010 | Hao ............... H03M 13/13 714/777 |
| 2012/0275466 A1* | 11/2012 | Bhadra ............ H04L 47/2441 370/419 |
| 2013/0311492 A1 | 11/2013 | Calvignac et al. |
| 2014/0006706 A1 | 1/2014 | Wang |
| 2014/0089498 A1* | 3/2014 | Goldfarb .......... H04L 63/0263 709/224 |
| 2014/0201307 A1 | 7/2014 | Banavalikar et al. |
| 2014/0215144 A1 | 7/2014 | Valency et al. |
| 2014/0310307 A1 | 10/2014 | Levy et al. |
| 2015/0058595 A1 | 2/2015 | Gura et al. |
| 2015/0127900 A1 | 5/2015 | Dharmapurikar et al. |
| 2015/0207735 A1 | 7/2015 | Kuramoto |
| 2015/0242429 A1* | 8/2015 | Varvello ........... H04L 45/7453 707/752 |
| 2015/0244842 A1* | 8/2015 | Laufer ............... H04L 69/22 370/392 |
| 2016/0294625 A1* | 10/2016 | Mahkonen ........... H04L 43/08 |
| 2017/0046395 A1 | 2/2017 | Li et al. |
| 2017/0147254 A1 | 5/2017 | Adams et al. |
| 2017/0195253 A1 | 7/2017 | Annaluru et al. |
| 2017/0346765 A1 | 11/2017 | Immidi |

OTHER PUBLICATIONS

Kasnavi et al., "A cache-based internet protocol address lookup architecture", Computer Networks, vol. 52, pp. 303-326, year 2008.
Demetriades et al., "An Efficient Hardware-basedMulti-hash Scheme for High Speed IP Lookup", 16th IEEE Symposium on High Performance Interconnects, pp. 103-110, Aug. 26-28, 2008.
Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.
Laurence et al., "Spam Based Architecture for tcam for Low Area and Less Power Consumption", ARPN Journal of Engineering and Applied Sciences, vol. 10, No. 17, pp. 7607-7612, Sep. 2015.
Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.
Levy et al., U.S. Appl. No. 14/827,373, filed Aug. 17, 2015.
Pagh, R., "Cuckoo Hashing for Undergraduates", IT University of Copenhagen, 6 pages, Mar. 27, 2006.
Pagh et al., "Cuckoo Hashing", Journal of Algorithms, vol. 51, pp. 122-144, May 2004.
Kirsch et al., "Less Hashing, Same Performance: Building a Better Bloom Filter", Random Structures and Algorithms, vol. 33, issue 2, pp. 187-218, Sep. 2008.
Kirsch et al., "More Robust Hashing: Cuckoo Hashing with a Stash", SIAM Journal on Computing, vol. 39, Issue 1, pp. 1543-1561, Sep. 2009.
Patrow, A., "General Purpose Hash Function Algorithms", 6 pages, year 2000. http://www.partow.net/programming/hashfunctions/.
Levy et al., U.S. Appl. No. 14/846,777, filed Sep. 6, 2015.
Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.
Waldvogel et al., "Scalable High-Speed Prefix Matching", ACM Transactions on Computer Systems (TOCS), vol. 19, Issue 4, pp. 440-482, Nov. 2001.
Vamanan et al., "EffiCuts: optimizing packet classification for memory and throughput", Proceedings of the SIGCOMM conference, New Delhi, India, pp. 207-218, Aug. 30-Sep. 3, 2010.
Singh et al., "Packet classification using multidimensional cutting", Proceedings of SIGCOMM Conference, Karlsrube, German, pp. 213-224, Aug. 25-29, 2003.
Taylor et al., "ClassBench: a packet classification benchmark", WUCSE-2004-28, Applied Research Laboratory Department of Computer Science and Engineering, Washington University, Saint Louis, USA, 37 pages, May 21, 2004.
U.S. Appl. No. 14/827,373 office action dated Oct. 6, 2017.
U.S. Appl. No. 14/846,777 office action dated Nov. 30, 2017.
European Application # 17189940 search report dated Jan. 26, 2018.
U.S. Appl. No. 15/469,530 office action dated Dec. 14, 2018.
Che et al., "DRES: Dynamic Range Encoding Scheme for TCAM Coprocessors", IEEE Transactions on Computers, vol. 57, No. 7, pp. 902-915, Jul. 2008.
Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.
Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.
Liu et al., "Complete Redundancy Removal for Packet Classifiers in TCAMs", IEEE Transactions on Parallel and Distributed Systems, vol. 21, No. 4, pp. 424-437, Apr. 2010.
Taylor et al., "Scalable Packet Classification using Distributed Crossproducting of Field Labels", IEEE INFOCOM, pp. 1-12, year 2005.
U.S. Appl. No. 15/663,758 office action dated Mar. 28, 2019.

* cited by examiner

HIGH-PERFORMANCE BLOOM FILTER ARRAY

CROSS-REFERENCE TO RELATED APPLICATION

This application shares disclosure with another U.S. patent application, filed on even date, entitled "Efficient Lookup of TCAM-like Rules in RAM" Ser. No. 14/827,373, which is incorporated herein by reference.

FIELD OF THE INVENTION

The present invention relates generally to data structures and their storage, and particularly to methods and devices for efficient storage and lookup of classification rules.

BACKGROUND

Packet-transfer devices in high-speed data networks, such as switches and routers, are required to perform flexible and sophisticated packet classification at high speed. For this purpose, many switches and routers use ternary content-addressable memory (TCAM) components to store rules that are to be applied in processing packets. To search the TCAM, several fields of the packet (typically header fields) are concatenated to form a key. A match between the key and a given TCAM entry can be used to trigger various actions for application by the network device, such as forwarding decisions, packet encapsulation and de-capsulation, security filtering, and quality of service classification.

TCAM is advantageous in that it is able to hold search entries that contain not only ones and zeroes, to be matched against the key, but also "don't care" bits, which will match either a zero or a one in the key. These "don't care" bits in the TCAM entries are commonly referred to as "masked" bits, while bits having a defined value (1 or 0) are referred to as "unmasked." TCAM thus affords a high degree of flexibility in rule definition. As against these advantages, however, TCAMs are costly in terms of power consumption and chip area, and these costs effectively limit the number of rules that can be supported by a single network device.

SUMMARY

Embodiments of the present invention that are described hereinbelow provide methods and apparatus for efficient classification using Bloom filters.

There is therefore provided, in accordance with an embodiment of the invention, a method for classification, which includes extracting, in a decision logic pipeline, respective classification keys from a collection of data items. A set of patterns is defined for matching to the classification keys. A plurality of memory banks containing respective Bloom filters are provided. Each Bloom filter is configured to indicate, for any given classification key, one or more patterns in the set that are candidates to match the given classification key. For each pattern among the patterns in the set, a respective first hash function is applied to the classification keys in order to select, for each classification key, one of the Bloom filters to query for the pattern. The one of the Bloom filters that is selected for each pattern is queried by applying a respective second hash function to each classification key, so as to receive from the Bloom filters an indication of the one or more candidate patterns. The data items are classified by matching the respective classification keys against the candidate patterns.

In the disclosed embodiments, each classification key includes a string of bits, and defining the set of patterns includes receiving a corpus of rules for matching to the classification keys, and extracting rule patterns defining different, respective sequences of masked and unmasked bits to which one or more of the rules conform. In one embodiment, defining the set of patterns includes grouping the rule patterns into extended rule patterns, wherein the Bloom filters are configured to indicate the extended rule patterns that are candidates to match the classification keys. Matching the respective classification keys includes computing rule entries corresponding to the rules using the extended rule patterns into which the rule patterns are grouped, storing the rule entries in a random access memory (RAM), and matching the respective classification keys to the rule entries in the RAM.

In some embodiments, providing the plurality of memory banks includes configuring the Bloom filters so that each Bloom filter is configured to indicate multiple patterns in the set that are candidates to match the classification keys. Typically, each Bloom filter is configured to indicate that any of the patterns in the set is a candidate pattern to match the classification keys, and the first hash function for each pattern is configured to select any of the Bloom filters.

In some embodiments, the set of patterns consists of a first number of the patterns, and wherein the plurality of the memory banks contains of a second number of the Bloom filters that is greater than the first number. Typically, applying the first hash function includes selecting multiple ones of the Bloom filters, including the one of the Bloom filters that is selected for each pattern, and querying the one of the Bloom filters includes addressing the multiple ones of the Bloom filters concurrently. In a disclosed embodiment, the second number is at least twice the first number.

In one embodiment, each classification key includes a string of bits, and defining the set of patterns includes defining a respective mask corresponding to each pattern, and applying the first and second hash functions includes computing the first and second hash functions for each pattern after applying the respective mask to the bits of each classification key.

In some embodiments, the data items includes data packets received from a network, and extracting the classification keys includes extracting specified bits from selected fields in the data packets. In a disclosed embodiment, the decision logic pipeline is embedded in a switching element in the network, and classifying the data items includes looking up, responsively to the matched candidate patterns, rule entries that define actions to be applied to the data packets by the switching element, and applying the actions to the data packets in the switching element.

There is also provided, in accordance with an embodiment of the invention, a method for classification, which includes extracting, in a decision logic pipeline, respective classification keys from a collection of data items, each classification key having a respective key type associated therewith. A set of patterns is defined for matching to the classification keys, including a first subset of the patterns associated with a first key type and a second subset of the patterns associated with a second key type, different from the first key type. A plurality of memory banks containing respective Bloom filters are provided. Each Bloom filter is configured to indicate, for any given classification key, whether a given pattern in the set is a candidate to match the given classification key. For each pattern among the patterns in the set, an offset is applied, determined by the key type, in order to select, for each classification key, one of the Bloom filters to query for the pattern. The one of the Bloom filters that is selected for each pattern is queried by applying a hash function to each classification key, so as to receive from the Bloom filters an indication of one or more candidate patterns. The data items are classified by matching the respective classification keys against the candidate patterns.

There is additionally provided, in accordance with an embodiment of the invention, classification apparatus, including a plurality of memory banks containing respective Bloom filters. Each Bloom filter is configured to indicate, for any given classification key, one or more patterns in a set of predefined patterns that are candidates to match the given classification key. A decision logic pipeline is configured to extract respective classification keys from a collection of data items, to apply, for each pattern among the patterns in the set, a respective first hash function to the classification keys in order to select, for each classification key, one of the Bloom filters to query for the pattern, to query the one of the Bloom filters that is selected for each pattern by applying a respective second hash function to each classification key, so as to receive from the Bloom filters an indication of the one or more candidate patterns, and to classify the data items by matching the respective classification keys against the candidate patterns.

The present invention will be more fully understood from the following detailed description of the embodiments thereof, taken together with the drawings in which:

DETAILED DESCRIPTION OF EMBODIMENTS

Overview

Figure 1:
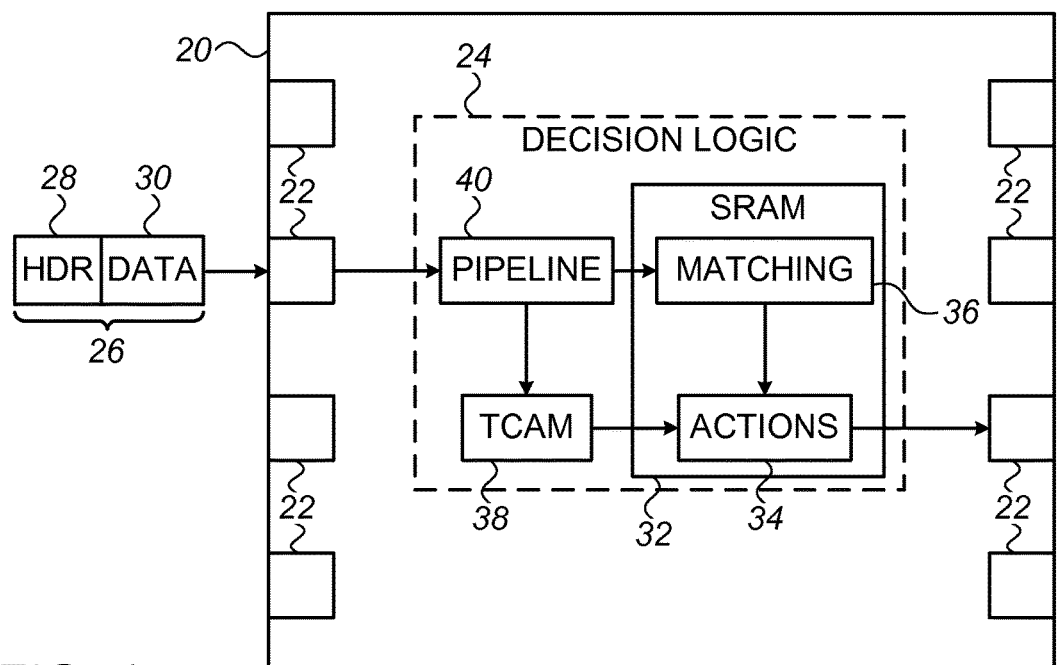
FIG. 1 is a block diagram that schematically illustrates a packet switch, in accordance with an embodiment of the invention.

Large-scale, high-speed packet networks, such as those deployed in modern data centers, require switching and forwarding elements to support large numbers of rules for packet classification and handling. New network management standards and practices, such as the OpenFlow protocol, are driving demand both to increase the number of rules implemented by network elements and to enable frequent modification of the rules by remote administration. Given the cost, size, and power consumption of TCAM devices, there is a need for RAM-based packet classification solutions. RAM-based solutions are also advantageous in that RAM in a network element can be shared flexibly between packet classification and other functions, in contrast to TCAM, which is dedicated to a single purpose.

Embodiments of the present invention that are described herein provide an efficient framework for classification of data items, such as data packets, using rule entries stored in RAM. The disclosed embodiments include the following components:

A static RAM (SRAM) to store most of the rules, possible shared with other data.

A small TCAM to store a minor part of the rules.

Bloom filters to reduce the search time on the SRAM, thus enabling a higher lookup rate.

Insertion, deletion and optimization processes to support initial configuration and subsequent online changes of the corpus of rules.

The disclosed embodiments enable exact matching of classification keys using hash tables. (Hash tables require only RAM, and not TCAM.) Since TCAM rules can include don't care ('x') bits, they cannot be directly used in the exact matching tables, because a hash function will not generally map all the rules that match the 'x' bits to a unique position. Therefore, in the present embodiments, the rules are mapped to entries in a matching table in RAM using only the bits of the rules that are unmasked (having the value '1' or '0', and not 'x'). This mapping makes use of "rule patterns," which define sequences of masked and unmasked bits to which one or more of the rules conform. In other words, denoting the unmasked bits as 'u' (which can be '0' or '1' but not an 'x'), any given rule pattern is defined by the positions of the u bits. The rules belonging to a rule pattern can then be stored and retrieved using exact matching on the 'u' bits.

If only the rule patterns were used for matching, however, the number of accesses to the hash tables in the RAM would grow with the number of rule patterns, resulting in performance degradation. The disclosed embodiments address this problem in two ways:

By using Extended Rule Patterns (eRPs) to group multiple rule patterns together for a single exact-match access, by using a subset of the unmasked 'u' bits for the hash. In other words, the respective set of unmasked bits in any rule pattern that is grouped into any given extended rule pattern is a superset of the unmasked bits in the given extended rule pattern. (The terms "subset" and "superset" as used herein include improper subsets and supersets, i.e., a rule pattern may have the same set of 'u' bits as the extended rule pattern to which it belongs.)

By using Bloom filters to reduce the list of rule patterns to search for a given key. In a disclosed embodiment, multiple memory banks containing respective Bloom filters can be queried concurrently in order to increase throughput and reduce decision latency.

Special flags can also be added to the rules in order to force end of search upon matching a rule for which there is no other possible matching rule with higher priority.

The small TCAM can be used to temporarily store new rules until they are incorporated into the matching database in the RAM. Rules that do not belong to a rule pattern with many rules can also be stored in the TCAM. Lookup for each key is typically performed initially in the RAM, and the TCAM is accessed as needed based on the results of the RAM lookup.

In some of the disclosed embodiments a decision logic pipeline in a network element or other classification apparatus extracts respective classification keys from a collection of data items, such as data packets arriving at the network element. Each classification key comprises a string of bits. A corpus of rules is provided for matching to the classification keys, and rule patterns are extracted from the corpus, wherein the rule patterns define different, respective sequences of masked and unmasked bits to which one or more of the rules conform, as explained above. The rule patterns are grouped into extended rule patterns. Rule entries corresponding to the rules are then computed using the extended rule patterns into which the rule patterns are grouped, and these rule entries are stored in RAM. The decision logic pipeline classifies the data items by matching the respective classification keys to the rule entries in the RAM.

The extended rule patterns and rule entries corresponding to a given corpus of rules may be computed by a suitable programmable processor that is embedded in the classification apparatus itself. Alternatively or additionally, an external computer may receive the rules and compile the rule entries for download to the memory of the classification apparatus.

The Bloom filters that are used in some embodiments of the present invention may similarly be computed either within the classification apparatus or by an external processor. In the disclosed embodiments, the Bloom filters are used in selecting candidate extended rule patterns for matching to classification keys. In other embodiments, however, the Bloom filters may be applied in identifying other sorts of candidate patterns, such as strings used in longest prefix matching (LPM), both for packet processing and for other data classification applications.

In the Bloom filter embodiments (both for packet classification and for other applications), a certain set of patterns is defined for matching to the classification keys of a collection of data items, and a plurality of memory banks containing respective Bloom filters are used in identifying candidates for matching in the set of patterns. In other words, each of these Bloom filters is able to indicate, for any given classification key, one or more patterns in the set that are candidates to match the given classification key. In the case of extended rule patterns, this indication guides the decision logic pipeline in choosing which mask to apply and which rule entries to check in the subsequent exact matching stage. Using multiple Bloom filters in different memory banks (typically more banks than there are patterns to match) enables the logic to select and query multiple Bloom filters concurrently with few collisions.

For each of the patterns in the set around which the Bloom filters are built, a decision logic pipeline applies a respective hash function to the classification keys and uses the resulting hash values to select, for each classification key, one of the Bloom filters to query for that pattern. Typically, the respective hash functions are applied at this stage in parallel, thus indicating multiple, corresponding Bloom filters (in different, respective memory banks) to be queried in parallel. For each pattern, the pipeline then applies another hash function to the classification key and uses the hash value in querying the selected Bloom filter. The corresponding Bloom filter outputs provide an indication of the patterns that are candidates for matching.

In this dual-hash approach, the Bloom filter entries for each of the patterns are typically distributed across all (or almost all) of the memory banks. Consequently, the query load is balanced across the memory banks, and the false positive rate of the Bloom filters is statistically the same for all of the patterns, regardless of the relative frequencies of occurrence of the different patterns among the classification keys.

System Description

FIG. 1 is a block diagram that schematically illustrates a network element 20, which operates as packet classification apparatus in accordance with an embodiment of the invention. Typically, network element is configured as a network switch or router, for example, with multiple ports 22 connected to a packet communication network. Decision logic 24 within element applies classification rules in forwarding data packets 26 between ports 22, as well as performing other actions, such as encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 24.

In the pictured embodiment, decision logic 24 receives packet 26 containing a header 28 and payload data 30. A processing pipeline 40 in decision logic 24 extracts a classification key from each packet 26, typically (although not necessarily) including the contents of certain fields of header 28. For example, the key may comprise the source and destination addresses and ports and a protocol identifier. Pipeline 40 matches the key against a matching database 36 containing a set of rule entries, which is stored in an SRAM 32 in network element 20, as described in detail hereinbelow. SRAM 32 also contains a list of actions 34 to be performed when a key is found to match one of the rule entries. For this purpose, each rule entry typically contains a pointer to the particular action that logic 24 is to apply to packet 26 in case of a match.

In addition, network element 20 typically comprises a TCAM 38, which contains rules that have not been incorporated into the matching database 36 in SRAM 32. TCAM 38 may contain, for example, rules that have recently been added to network element 20 and not yet incorporated into the data structure of matching database 36, and/or rules having rule patterns that occur with low frequency, so that their incorporation into the data structure of matching database 36 would be impractical. The entries in TCAM 38 likewise point to corresponding actions 34 in SRAM 32. Pipeline 40 may match the classification keys of all incoming packets 26 against both matching database 36 in SRAM 32 and TCAM 38. Alternatively, TCAM 38 may be addressed only if a given classification key does not match any of the rule entries in database 36 or if the matching rule entry indicates (based on the value of a designated flag, for example) that TCAM 38 should be checked, as well, for a possible match to a rule with higher priority.

The balance between the size of the set of rule entries in database 36 in SRAM 32 and the size of TCAM 38 can be determined at the convenience of the designer of decision logic 24. In any case, TCAM 38 will be considerably smaller than would be required to hold the entire corpus of classification rules. In some cases, SRAM 32 may contain rule entries in database 36 corresponding to all of the classification rules, in which case TCAM 38 may be eliminated.

Pipeline 40 typically comprises dedicated or programmable hardware logic, which is configured to carry out the functions described herein. Pipeline 40 typically also contains a number of banks of dedicated memory for implementation of the Bloom filters shown in FIG. 6, either on the same chip as the hardware logic or in a separate memory chip. For example, pipeline 40 may comprise a suitable application-specific integrated circuit (ASIC). Alternatively or additionally, at least some of the functions of pipeline 40 may be implemented in a standalone or embedded microprocessor. (For example, such a microprocessor may be responsible for compiling classification rules received by network element 20 into matching database 36.) The microprocessor performs its functions under the control of software instructions, which are typically stored in tangible, non-transitory computer-readable storage media, such as electronic, optical, or magnetic memory media.

Rule Matching Based on Extended Rule Patterns

Figure 2:
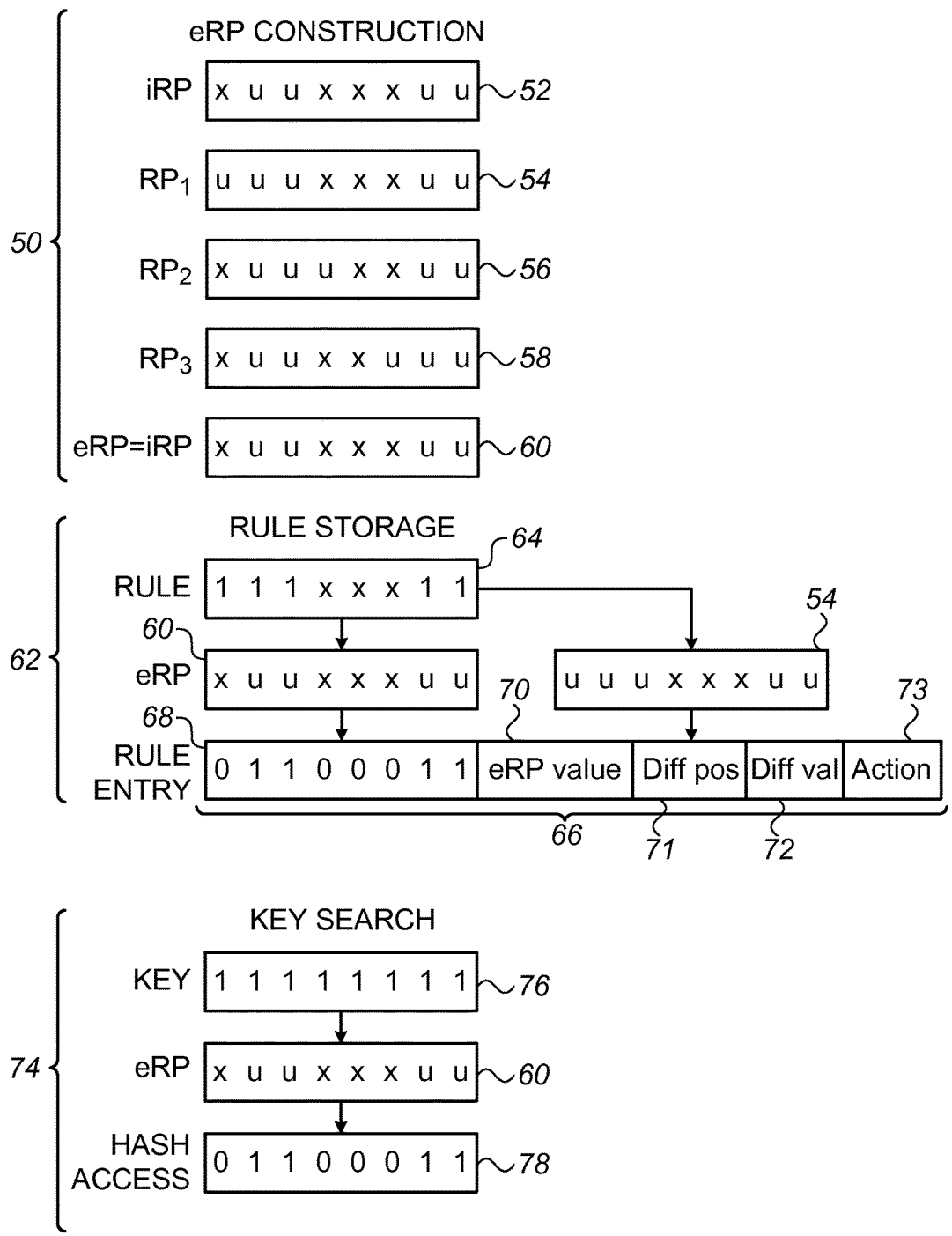
FIG. 2 is a block diagram that schematically illustrates data structures used in rule-based classification, in accordance with an embodiment of the invention.

FIG. 2 is a block diagram that schematically illustrates data structures used in rule-based classification, in accordance with an embodiment of the invention. First, in an eRP construction phase 50, rule patterns 52, 54, 56, 58, . . . , are extracted from the given corpus of rules and are grouped together according to similarity. (The process of eRP construction is described systematically hereinbelow with reference to FIG. 4.) In the example shown in FIG. 2, the rules are eight bits long, although in practical applications, the rules are generally much longer. Each rule pattern (RP) typically corresponds to a large number of actual rules, which share the same pattern of masked ('x') and unmasked ('u') bits. Thus, for instance, rule pattern 54 ('uuuxxxuu') would be shared by the rules '111xxx11', '100xxx01', and so forth. Each rule also includes an action, or equivalently a pointer to one of actions 34 in SRAM 32, that is to be carried out when the classification key matches the rule; but this part of the rules is omitted here for the sake of simplicity.

To begin phase 50, an initial rule pattern (iRP) 52 is selected from the corpus of rules to be implemented by network element 20. Additional rule patterns 54, 56, 58, . . . , are then identified that differ from iRP 52 by no more than a certain number of 'x' or 'u' bits. In the example shown in FIG. 2, each of rule patterns 54, 56, 58 differs from iRP 52 by addition of one unmasked bit in the pattern. In practice, the inventors have found that grouping rule patterns that differ by up to a single byte gives good results, but various other pattern grouping strategies may alternatively be applied.

An eRP 60 is then chosen to which all of the group of rule patterns 52, 54, 56, 58 conform, meaning that the set of unmasked bits in any of the rule patterns that is grouped into the eRP is a superset of the unmasked bits in the eRP. In this case, eRP 60 is identical to iRP 52, but this will not always be the case. (The unmasked bits in iRP 52 in this case are an improper superset of those in eRP 60.) Optimally, the eRP is selected so as to maximize the number of the rules that conform to the eRP while differing from the eRP by no more than a predefined number of bits (for example, up to one byte) that are unmasked in the rule patterns but masked in the eRP.

Once eRP 60 is chosen, rule entries 66 are created and stored in matching database 36 in SRAM 32, based on the corresponding rule patterns 54, 56, 58, . . . , in a rule storage phase 62. In this example, a rule entry 66 is created for a rule 64, which has the form '111xxx11' and thus corresponds to rule pattern 54. Each rule entry comprises a matching value 68, obtained by applying the corresponding eRP 60 as a mask to the rule. In this masking operation, an 'x' value in any bit position results in a bit value of '0' in the corresponding matching value. The location at which any given rule entry 66 is stored in SRAM is determined by taking a predefined hash over matching value 68.

In addition, rule entry 66 comprises a value 70 corresponding to the eRP 60 of rule pattern 54 to which rule 64 conforms and a difference indication, which includes a difference position 71 identifying the unmasked bits by which the rule pattern, and hence rule 64 itself, differs from the eRP, and a difference value 72, giving the actual values of these different bits. (In the pictured example, difference position 71 will mark the most significant bit of rule 64, and difference value 72 will be one.) The difference indication is used in a subsequent key search phase 74 in compactly identifying the rule pattern for each rule entry 66, thus obviating the need to match the entire rule pattern in each rule entry during the key search phase. In some embodiments, when difference position 71 refers to a field bigger than a single bit, rule entry 66 can include both difference value 72 and a mask. This approach is useful, for example, when position 71 indicates a byte difference, while the specific rules differ from the eRP only by a nibble (4 bits).

In addition to matching value 68, eRP value 70 and difference position 71 and value 72, rule entry 66 in SRAM 36 also contains a pointer 73 to the action to be taken in case of a match. In addition, when different key types are defined for different sorts of packets (for example, IPv4 as opposed to IPv6 packets), each rule entry will contain a key type field. This element is omitted from FIG. 2, however, for the sake of simplicity.

In key search phase 74, pipeline 40 extracts a classification key 76 from each incoming packet and selects one or more candidate eRPs to check for possible matches to the key. For each of these candidate eRPs, pipeline 40 applies a corresponding mask to the bits of key 76, to generate a hash access code 78, which comprises the bits of the classification key that are unmasked by the mask. The pipeline uses a hash over code to select and search rule entries 66 in matching database 36 in SRAM 32 that are associated with the given eRP, and then matches access code 78 to the unmasked bits in matching values 68. In addition, the bits in key 76 at the positions marked by difference position 71 are checked against the corresponding bits of difference value 72 rule 64.

The inventors have found the data structures shown in FIG. 2 and the corresponding matching computations, as described above and detailed further in FIG. 3, to be particularly efficient in searching over the sort of corpus of rules that is commonly used in switching elements in complex networks (for example, 1000 rules to be applied to classification keys of 100-200 bits, with 50 common rule patterns and eight eRPs). Alternatively, other sorts of rule entries and matching approaches may be used, based on eRPs, for example, constructing rule entries that explicitly include and make use of the rule pattern of each rule. All such alternative implementations are considered to be within the scope of the present invention.

Figure 3:
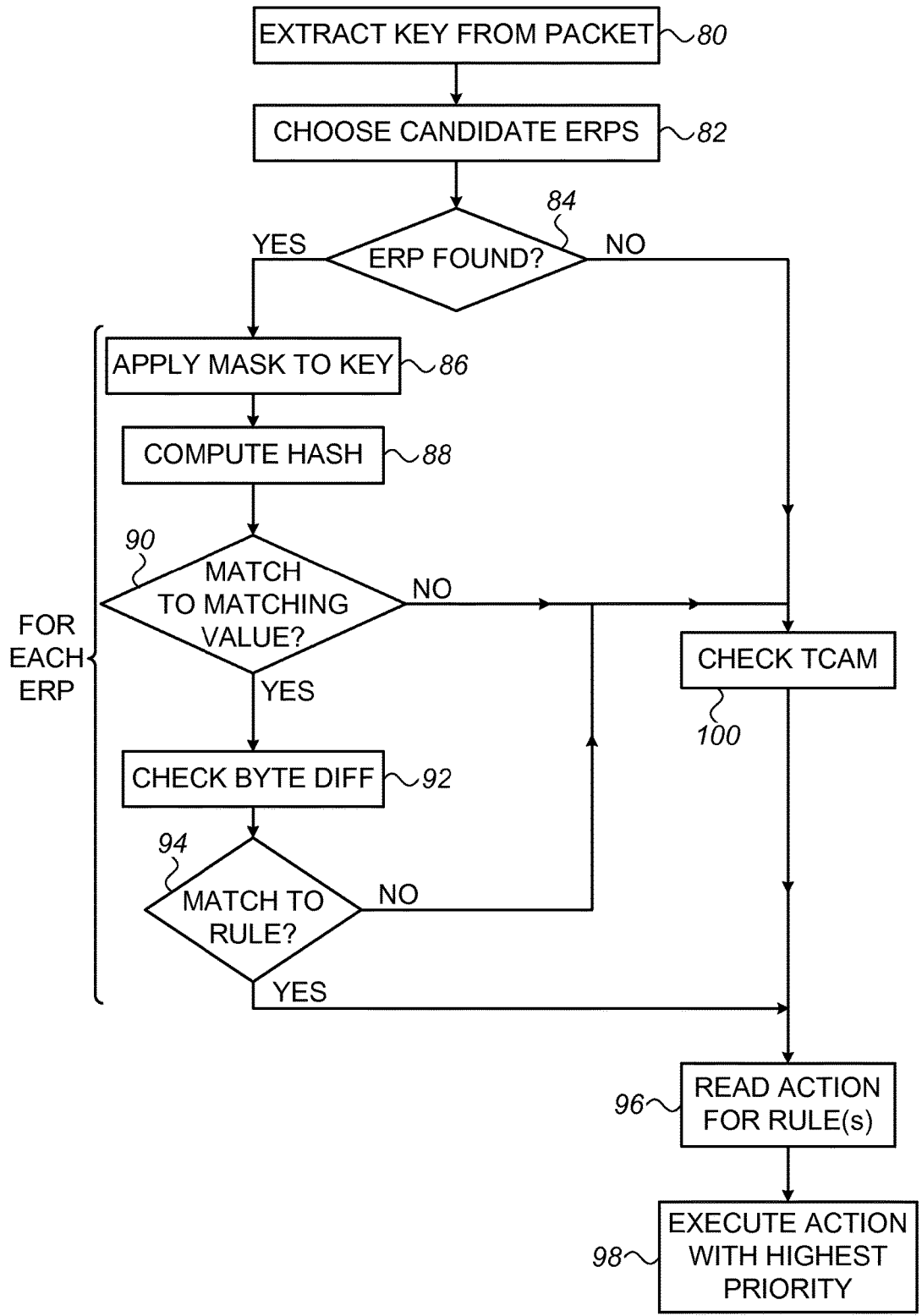
FIG. 3 is a flow chart that schematically illustrates a method for packet classification, in accordance with an embodiment of the invention.

FIG. 3 is a flow chart that schematically illustrates a method for packet classification, in accordance with an embodiment of the invention. For the sake of clarity, this method is described with reference to the apparatus of FIG. 1 and the data structures that are shown in FIG. 2. Variations on this method using other apparatus and alternative data structures built around extended rule patterns, such as those mentioned above, will be apparent to those skilled in the art after reading the present description and are also within the scope of the present invention. Furthermore, although this and other embodiments described herein relate specifically to processing of data packets, the principles of these embodiments may similarly be applied in processing other sorts of data items, for example in applications requiring template matching.

Upon receiving data packet 26, pipeline 40 extracts key 76 from the packet, at a key extraction step 80. Typically, the key comprises a bit string made up by concatenating the contents of certain fields of header 28, as in packet handling protocols that are known in the art. Based on the key 76, pipeline 40 chooses extended rule patterns that are candidates for matching to the key, at an eRP selection step 82.

These extended rule patterns are "candidates" in the sense that, for each candidate eRP, there is a reasonable probability that there is a matching rule entry 66 with the corresponding eRP value 70. The candidate eRPs may be selected efficiently at step 82 by applying a set of Bloom filters to key 76. The structure and operation of a suitable set of Bloom filters for this purpose is described hereinbelow with reference to FIG. 6.

Pipeline 40 checks the results of step 82, for example by reading the output of the Bloom filters, at an eRP identification step 84. Assuming one or more candidate eRPs are identified, pipeline applies each eRP 60 as a mask to key 76 in order to generate a suitable hash access code 78 to match against the rule entries 66 belonging to this eRP, at a masking step 86. The pipeline then computes a predefined hash of the hash access code, at a hash computation step 88. This hash indicates an address to access in the SRAM in order to retrieve the rules entries of this eRP stored in that position. The pipeline compares matching values 68 of rule entries 66 having the corresponding eRP value 70, at a hash matching step 90. Pipeline 40 also checks key 76 against the byte difference (value and mask) given by difference position 71 and difference value 72 in each rule entry 66, at a difference checking step 92. Although this step is separated in FIG. 3 for the sake of conceptual clarity, it may advantageously be performed concurrently with step 90, using a single lookup in SRAM 32.

By finding a match between a given key 76 and the elements of rule entry 66, pipeline 40 verifies that the key satisfies the actual rule 64, at a rule matching step 94. If so, logic 24 uses action pointer 73 in the rule entry to read the appropriate action 34 from SRAM 32, at an action reading step 96. Logic 24 then proceeds to execute the action, handling packet 26 accordingly, at an execution step 98.

When pipeline 40 identifies more than one rule that is matched by the key of the current packet 26, it chooses the rule with the highest priority for execution. For this purpose, the action pointers in the rules typically include an indication of priority level. Alternatively or additionally, logic 24 may apply other criteria in prioritizing the rules and possible actions.

On the other hand, in some cases, pipeline 40 will reach a decision that there is no rule entry 66 in SRAM 32 that can match the present key 76. For example, there may be no candidate eRPs found at step 84, no matching hash at step 90, or no match to the rule in question at step 94. In such cases, pipeline 40 will look up the key in TCAM 38, at a TCAM checking step 100. If a match is found in TCAM 38, logic will then read and perform the action indicated by the corresponding TCAM entry at steps 96 and 98.

Alternatively or additionally, pipeline 40 may check TCAM 38 in some or all cases even when a matching rule is found in SRAM 32 at step 94. In such cases, the rule in TCAM 38 may be given priority, or the priority level indications in the rules may be used to choose the rule that will be executed.

In one embodiment, the rules in SRAM 32 contain flags to indicate, when a match is found at step 94, whether pipeline 40 should continue searching for matches with higher priority. For example, each rule in matching database 36 may contain a flag to indicate whether or not to proceed with a lookup in TCAM 38 when a match to the rule is found at step 94. Additionally or alternatively, each rule in SRAM 32 may contain a flag to indicate whether or not to continue checking other candidate eRPs (if other candidates remain) after finding a match to the rule. These flags are useful in avoiding superfluous lookups.

Construction of Rule Entries

Figure 4:
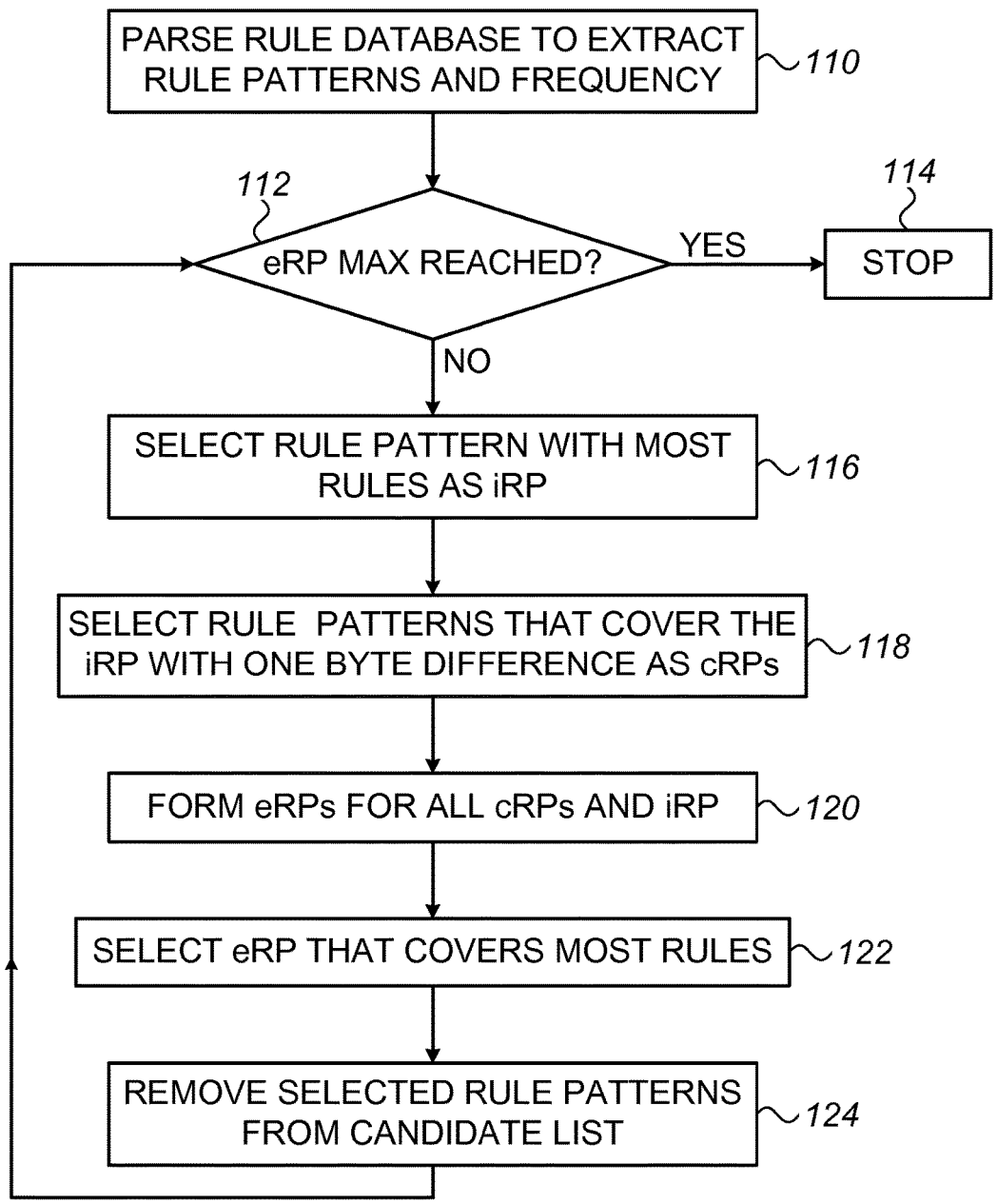
FIG. 4 is a flow chart that schematically illustrates a method for building a set of rule entries, in accordance with an embodiment of the invention.

FIG. 4 is a flow chart that schematically illustrates a method for building a set of rule entries in database 36, in accordance with an embodiment of the invention. In the present example, the entries are assumed to have the form of entry 66 in FIG. 2, based on eRP 60 and byte differences between the rule patterns and the eRP in which they are grouped, as described above. The inventors have found the present method to enable efficient construction of rule entries for storage and lookup in SRAM 32 for the large majority of the rules in a given corpus. Alternatively, variations on this method will be apparent to those skilled in the art after reading the present description and are considered to be within the scope of the present invention.

As explained above, the compilation of rule entries in accordance with the method of FIG. 4 may be carried out either by an embedded processor in logic 24 or by an external processor (not shown in the figures). In either case, upon receiving a corpus of rules, the processor parses the rules in order to extract the rule patterns, at a pattern extraction step 110. Typically, a large number of different rules can share the same rule pattern. The processor thus counts the frequency of each pattern, i.e., the number of rules in the corpus that share each pattern.

To group the rule patterns into eRPs, the processor iterates through the set of rule patterns multiple times, until a predefined maximum number of eRPs is extracted (for example, eight eRPs), at an eRP counting step 112. At this point, the compilation process stops, at a termination step 114, and any remaining rules, having respective rule patterns that do not fit any of the extended rule patterns, are stored as rule entries in TCAM 38.

To begin each iteration, the processor selects, from a list of the rule patterns extracted at step 110, an initial rule pattern (iRP), such as iRP 52, at an iRP selection step 116. The processor typically selects as iRP the rule pattern on the list having the highest frequency among the rules in the corpus. The processor then searches for other rule patterns on the list that satisfy a similarity criterion with respect to the initial rule pattern, at a rule pattern selection step 118. In the present embodiment, the similarity criterion requires that these other rule patterns (referred to as "candidate rule patterns," or cRPs) differ from the iRP by at most one byte, such that the cRP has 'x' in the different bits and the iRP has 'u' bits. This criterion ensures that an eRP constructed from any of the cRPs will include the iRP. Alternatively, other similarity criteria, such as bit differences, may be used. In addition, the processor may require that the differences be of only one type, such as replacing 'x' bits in the iRP with 'u' bits in the cRPs, as illustrated in the example shown in FIG. 2.

Once the set of cRPs has been assembled, the processor defines extended rule patterns based on the iRP and cRPs, at an eRP formation step 120. Specifically, each of these RPs is used as the iRP to form an eRP, as shown in FIG. 2. As explained above, each such eRP will cover RPs that differ from the eRP by at most one byte, in which the RP contains 'u' bits in place of corresponding 'x' bits in the eRP. The processor is thus able to determine which RPs can be grouped in any possible eRP and, given the respective rule frequencies of the rule patterns found at step 110, how many rules are thus covered by each possible eRP. The processor selects the eRP that covers the largest number of rules, at an eRP selection step 122.

Upon selecting the eRP, the processor is able to construct rule entries 66 for all of the rule patterns that are grouped in the selected eRP, and stores these rule entries in matching database 36. All of these rule patterns are removed from the list that was originally created at step 110, at a pattern removal step 124. The processor then returns to step 112 and iterates through steps 116-122 again, using the abridged list of rule patterns, in order to select another eRP and the rule patterns belonging to it, and to create the corresponding rule entries. These iterations continue until the target number of eRPs is reached at step 112, or until there are no more rule patterns on the list.

Figure 5:
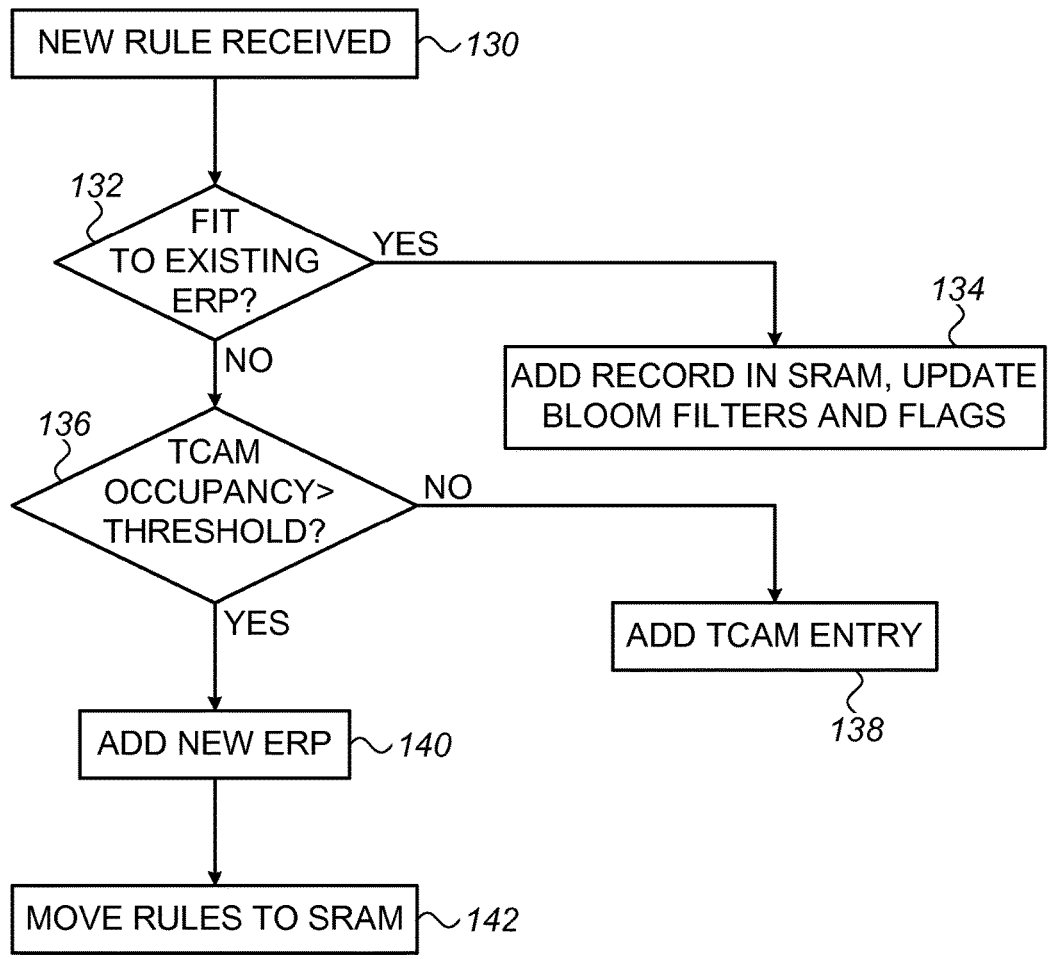
FIG. 5 is a flow chart that schematically illustrates a method for adding a new rule to a set of rule entries, in accordance with an embodiment of the invention.

FIG. 5 is a flow chart that schematically illustrates a method for adding a new rule to a corpus of rules, in accordance with an embodiment of the invention. In practical applications, the operator of the network in which element 20 is deployed will frequently change the rules for packet classification and handling, typically by removing old rules and adding new ones. These changes can be incorporated into the existing matching database without generally requiring changes to the existing framework of rule patterns and eRPs.

The method of FIG. 5 is initiated when the processor (embedded or external) receives a new rule for addition to the corpus or rules, at a new rule input step 130. The processor extracts the rule pattern from the new rule and ascertains whether this rule pattern is already grouped or can be grouped into any of the existing eRPs, at an eRP checking step 132. This sort of grouping will be possible, as explained above, if the rule pattern differs from the eRP by at most a certain number of bits (for example, one byte) that are masked in the eRP and unmasked in the rule pattern.

If the rule pattern fits an existing eRP, the processor computes and adds a corresponding rule entry for the new rule to matching database 36 in SRAM 32, as described above, at an SRAM entry addition step 134. The processor will also update the Bloom filters in pipeline (as described below), so that for any incoming packet 26 having a key 76 that matches the new rule, the Bloom filter will indicate that the eRP to which the new rule belongs is a candidate for matching. In addition, based on the priority of the new rule, the processor can update the flags of the rule entry to indicate whether or not, when the key of an incoming packet matches this rule entry, pipeline 40 should continue searching for other matching rule entries in SRAM 32 or in TCAM 38.

If the rule pattern of the new rule does not fit any existing eRPs, the processor checks the occupancy level of TCAM 38, at a TCAM checking step 136, in order to make sure that there is room available to store the new rule in the TCAM. To ensure that there will be room left in the TCAM for additional rules that are yet to come, it is desirable that the fill level of the TCAM not be allowed to pass a predefined threshold. As long as the fill level has not passed this threshold, the processor computes and stores a rule entry for the new rule in TCAM 38, at a TCAM entry addition step 138.

When the TCAM is found at step 136 to have passed the occupancy threshold, the processor attempts to increase the number of rule entries 66 in matching database 36 in SRAM 32 by adding a new eRP, at an eRP addition step 140. If the maximum number of eRPs has not yet been reached (step 112 in FIG. 4), the processor can run steps 116-122 over the rule patterns of the rules in TCAM 38 in order to choose the new eRP. Otherwise, it may be necessary to rerun all or a part of the eRP compilation process that was described above, in order to find one or more new eRPs that will contain a greater number of rules than one or more of the existing eRPs. Once the new eRP is chosen, the processor computes rule entries for the rules conforming to the new eRP and saves these rule entries in SRAM 32, at a new entry creation step 142. The entries in TCAM 38 corresponding to these rules can then be erased.

Bloom Filters

Figure 6:
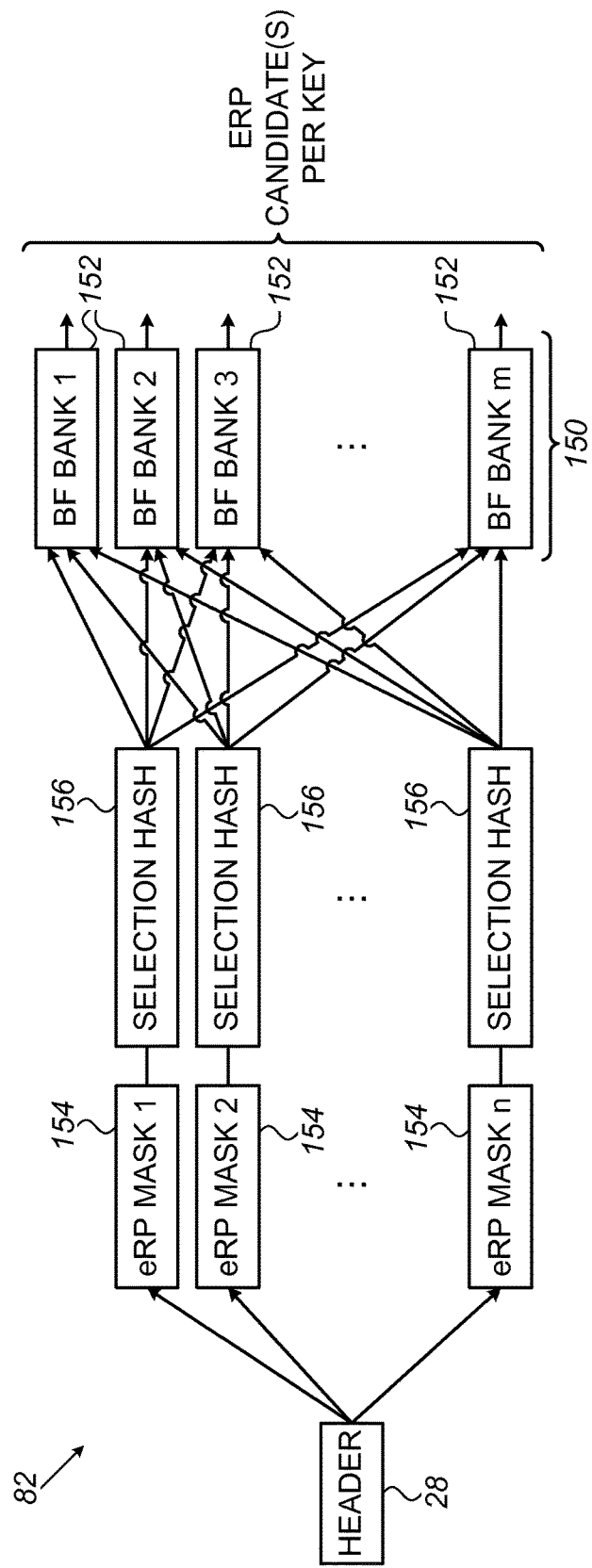
FIG. 6 is a block diagram that schematically illustrates a multi-bank Bloom filter, in accordance with an embodiment of the invention.

FIG. 6 is a block diagram that schematically illustrates a multi-bank Bloom filter 150, in accordance with an embodiment of the invention. Bloom filter 150 comprises multiple banks 152 of memory, which can be addressed concurrently. Each bank 152 contains a respective Bloom filter instance, and all of the Bloom filter instances in all of the banks function together as a collective Bloom filter, to indicate, for a given packet header 28, which eRPs are candidates for matching to the packet (step 82 in FIG. 3). In other words, for each packet 26, each bank 152 may indicate that a particular eRP is a candidate, and the union of the outputs of all the banks gives the complete list of candidates. Banks 152, however, are not uniquely assigned to respective eRPs, but rather, each bank 152 can contain Bloom filter entries corresponding to any or all of the eRPs. The solution supports any given n eRPs and m banks 152. In some embodiments, in order to improve performance, m and n are selected such that m>n, thus reducing the probability of bank access collisions.

To address Bloom filter 150, pipeline 40 extracts key 76 from header and applies n masks 154, corresponding to the n eRPs, to the key. This masking process is similar to that shown in FIG. 2 in key search phase 74, with each eRP defining a different, respective sequence of masked and unmasked bits. A selection hash 156 is applied to the access code (similar to code 78) resulting from each of the n eRP mask applications, to give a value indicating which of banks 152 to query for a possible match to that eRP. Each hash 156, in other words, gives a value that is evenly distributed between 1 and m, and thus may select any of banks 152. In this manner, selection hashes 156 typically select multiple Bloom filter banks 152 for each key (one selection for each eRP), and pipeline 40 then addresses all of the selected banks concurrently, except when a hash collision occurs.

Each selected Bloom filter instance applies a second hash to the masked key that it receives, giving a result that indicates which entry to check in the corresponding bank 152. In accordance with well-known Bloom filtering algorithms, if this entry is negative, the eRP in question is not a candidate for matching to this key. If the entry is positive, there may be a rule within the eRP that matches the key, but it is also possible that the filter result is a false positive and there is no such match. By virtue of distributing the eRP entries across banks 152 (rather than dedicating a particular bank or banks to each eRP), the lookup load is balanced across the banks, and the false positive rate for all the eRPs will be statistically equal, regardless of the relative frequencies of the rule patterns that are grouped in each eRP.

To add a Bloom filter entry for a given rule, the mask 154 of the eRP to which the rule belongs is applied to the rule, giving a result similar to matching value 68 (FIG. 2). Selection hash 156 is then applied to this result, indicating the bank 152 in which an entry for this rule should be added. The Bloom filter hash is applied to the masked rule, with the result indicating a corresponding entry in bank 152, and this entry is set to '1' to mark the match. Banks 152 are typically configured as counting Bloom filters, meaning that the entries in each bank are incremented for each new rule that is entered with the same Bloom filter hash result, and these entries are decremented when a rule is removed from the corpus. In this way, Bloom filter 150 can be easily updated when rules are added to the corpus (as illustrated in FIG. 5) or when rules are removed.

In some alternative embodiments, the Bloom filters are constructed so that each eRP has its own, independent memory bank. This sort of Bloom filter configuration is useful, inter alia, when decision logic 24 is required to support multiple different key types. For example, there may be one type of classification key for packets with IPv4 addresses and another type for packets with IPv6 addresses. In this case, a key type field is added to the keys extracted from the packets so that pipeline 40 can search for matching rules on each key type independently. Each eRP is identified by a number, and pipeline 40 adds an offset to the eRP number (modulo m, the number of banks), depending on the key type, in order to select the Bloom filter bank 152 to query. No selection hash is required in this case.

For example, let us assume that there are two key types: A and B, each with four eRPs. Pipeline adds an offset of 0 to the eRP number in order to select the Bloom filter bank for key_type A, and an offset of 4 for key_type B. In this manner, all the Bloom filter banks are used (in the present example, banks 0-3 for key_type A, and banks 4-7 for key_type B), without collisions on access, even if the number of eRPs per key_type is smaller than eight.

As noted earlier, although the Bloom filtering scheme of FIG. 6 is described above with reference specifically to identifying candidate eRPs, the principles of this scheme may similarly be applied, mutatis mutandis, in Bloom filter selection of other sorts of candidate patterns for matching, such as longest-prefix patterns.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for classification, comprising:
  extracting, in a decision logic pipeline, respective classification keys from a collection of data items, wherein each classification key comprises a string of bits;
  receiving a corpus of rules for matching to the classification keys;
  extracting from the corpus a set of rule patterns defining different, respective sequences of masked and unmasked bits to which one or more of the rules conform, for matching to the classification keys, and grouping the rule patterns into multiple extended rule patterns;
  computing rule entries corresponding to the rules using the extended rule patterns into which the rule patterns are grouped, storing the rule entries in a random access memory (RAM);
  providing a plurality of memory banks containing respective Bloom filters, each Bloom filter configured to indicate, for any given classification key, the extended rule patterns that are candidates to match the given classification key;
  for each extended rule pattern, applying a respective first hash function to the classification keys in order to select, for each classification key, one of the Bloom filters to query for the extended rule pattern;
  querying the one of the Bloom filters that is selected for each extended rule pattern by applying a respective second hash function to each classification key, so as to receive from the Bloom filters an indication of the one or more candidate patterns,
  wherein querying the one of the Bloom filters comprises addressing the respective Bloom filters in multiple ones of the memory banks in parallel; and
  classifying the data items by matching the respective classification keys to the rule entries in the RAM in accordance with the indication of the one or more candidate patterns provided by the Bloom filters.

2. The method according to claim 1, wherein each Bloom filter is configured to indicate that any of the extended rule patterns is a candidate pattern to match the classification keys, and the first hash function for each extended rule pattern is configured to select any of the Bloom filters.

3. The method according to claim 1, wherein the multiple extended rule patterns consist of a first number of the extended rule patterns, and wherein the plurality of the memory banks contains of a second number of the Bloom filters that is greater than the first number.

4. The method according to claim 3, wherein applying the first hash function comprises selecting multiple ones of the Bloom filters, comprising the one of the Bloom filters that is selected for each extended rule pattern, and wherein querying the one of the Bloom filters comprises addressing the multiple ones of the Bloom filters concurrently.

5. The method according to claim 3, wherein the second number is at least twice the first number.

6. The method according to claim 1, wherein each classification key comprises a string of bits, and wherein defining the set of patterns comprises defining a respective mask corresponding to each extended rule pattern, and wherein applying the first and second hash functions comprises computing the first and second hash functions for each extended rule pattern after applying the respective mask to the bits of each classification key.

7. The method according to claim 1, wherein the data items comprise data packets received from a network, and extracting the classification keys comprises extracting specified bits from selected fields in the data packets.

8. The method according to claim 7, wherein the decision logic pipeline is embedded in a switching element in the network, and wherein classifying the data items comprises looking up, responsively to the matched candidate patterns, rule entries that define actions to be applied to the data packets by the switching element, and applying the actions to the data packets in the switching element.

9. A method for classification, comprising:
  extracting, in a decision logic pipeline, respective classification keys from a collection of data items, each classification key comprising a string of bits and having a respective key type associated therewith;
  receiving a corpus of rules for matching to the classification keys;
  extracting from the corpus a set of rule patterns defining different, respective sequences of masked and unmasked bits to which one or more of the rules conform, for matching to the classification keys, including a first subset of the patterns associated with a first key type and a second subset of the patterns associated with a second key type, different from the first key type, and grouping the rule patterns into multiple extended rule patterns;

computing rule entries corresponding to the rules using the extended rule patterns into which the rule patterns are grouped, storing the rule entries in a random access memory (RAM);

providing a plurality of memory banks containing respective Bloom filters, each Bloom filter configured to indicate, for any given classification key, multiple patterns in the set that are candidates to match the given classification key;

for each pattern among the patterns in the set, applying an offset determined by the key type in order to select, for each classification key, the extended rule patterns to query for the pattern;

querying the one of the Bloom filters that is selected for each extended rule pattern by applying a hash function to each classification key, so as to receive from the Bloom filters an indication of one or more candidate patterns, wherein querying the one of the Bloom filters comprises addressing the respective Bloom filters in multiple ones of the memory banks in parallel; and classifying the data items by matching the respective classification keys to the rule entries in the RAM.

10. Classification apparatus, comprising:

a plurality of memory banks containing respective Bloom filters, each Bloom filter configured to indicate, for any given classification key, multiple patterns in a set of predefined patterns that are candidates to match the given classification key, wherein each classification key comprises a string of bits, and wherein the patterns comprise extended rule patterns, formed by grouping rule patterns extracted from a corpus of rules for matching to the classification keys and defining different, respective sequences of masked and unmasked bits to which one or more of the rules conform, wherein the Bloom filters are configured to indicate the extended rule patterns that are candidates to match the classification keys;

a random access memory (RAM), which is configured to store rule entries corresponding to the rules and containing an indication of the extended rule patterns into which the rule patterns are grouped; and a decision logic pipeline, which is configured to extract respective classification keys from a collection of data items, to apply, for each extended rule pattern, a respective first hash function to the classification keys in order to select, for each classification key, one of the Bloom filters to query for the extended rule pattern, to query the one of the Bloom filters that is selected for each extended rule pattern by applying a respective second hash function to each classification key, so as to receive from the Bloom filters an indication of the one or more candidate patterns, and to classify the data items by matching the respective classification keys to the rule entries in the RAM in accordance with the indication of the one or more candidate patterns provided by the Bloom filters, wherein the decision logic pipeline is configured to address the respective Bloom filters in multiple ones of the memory banks in parallel.

11. The apparatus according to claim 10, wherein each Bloom filter is configured to indicate that any of the extended rule patterns is a candidate pattern to match the classification keys, and the first hash function for each extended rule pattern is configured to select any of the Bloom filters.

12. The apparatus according to claim 10, wherein the multiple extended rule patterns consist of a first number of the extended rule patterns, and wherein the plurality of the memory banks contains of a second number of the Bloom filters that is greater than the first number.

13. The apparatus according to claim 12, wherein the decision logic pipeline is configured to apply the first hash function so as to select multiple ones of the Bloom filters, comprising the one of the Bloom filters that is selected for each pattern, and query the one of the Bloom filters by addressing the multiple ones of the Bloom filters concurrently.

14. The apparatus according to claim 12, wherein the second number is at least twice the first number.

15. The apparatus according to claim 10, wherein each classification key comprises a string of bits, and wherein a respective mask is defined corresponding to each extended rule pattern, and wherein the decision logic pipeline is configured to compute the first and second hash functions for each pattern after applying the respective mask to the bits of each classification key.

16. The apparatus according to claim 10, wherein the data items comprise data packets received from a network, and the classification keys comprise specified bits extracted from selected fields in the data packets.

17. The apparatus according to claim 16, and comprising:

multiple ports connected to the network; and decision logic, comprising the decision logic pipeline, coupled to forward the data packets among the ports and configured to look up, responsively to the matched candidate patterns, rule entries that define actions to be applied to the data packets and to apply the actions in forwarding the data packets.

* * * * *